United States Patent [19]

Kato et al.

[11] Patent Number: 4,544,962

[45] Date of Patent: Oct. 1, 1985

[54] METHOD AND APPARATUS FOR PROCESSING BINARY DATA

[75] Inventors: Misao Kato, Katano; Yasuharu Shimeki, Suita; Hiroshi Matsushima, Hirakata; Shiro Tsuji, Minoo; Nobuyoshi Kihara, Amagasaki; Yoshinori Amano, Osaka, all of Japan

[73] Assignee: Matsushita Electric Industrial Co., Ltd., Osaka, Japan

[21] Appl. No.: 394,766

[22] Filed: Jul. 2, 1982

[30] Foreign Application Priority Data

Jul. 6, 1981 [JP] Japan .................... 56-105800
Mar. 10, 1982 [JP] Japan .................... 57-38483
Mar. 19, 1982 [JP] Japan .................... 57-45015
May 20, 1982 [JP] Japan .................... 57-85900

[51] Int. Cl.⁴ .................................................. G11B 5/07
[52] U.S. Cl. ................................................... 360/40
[58] Field of Search ....................... 360/40, 39, 45, 32

[56] References Cited

U.S. PATENT DOCUMENTS

| | | | |
|---|---|---|---|
| 3,624,637 | 11/1971 | Irwin | 360/39 |
| 3,641,525 | 2/1972 | Milligan | 360/39 |
| 3,689,899 | 9/1972 | Franaszek | 340/347 DD |
| 4,146,909 | 3/1979 | Beckenhauer et al. | 360/40 |
| 4,201,980 | 3/1980 | Friedman et al. | 360/40 |
| 4,358,852 | 11/1982 | Ichikana et al. | 360/40 |
| 4,451,819 | 5/1984 | Beckenhauer | 360/40 |

OTHER PUBLICATIONS

"A New Look-Ahead Code for Increased Data Density," Jacoby, *IEEE Transactions on Magnetics* (vol. MAG-13, No. 5), Sep. 1977, pp. 1202–1204.

"Sequence-state Methods for Run-length-limited Coding," Franaszek, *IBM Journal of Research and Development* (vol. 14), Jul. 1970, pp. 376–383.

*Primary Examiner*—Vincent P. Canney
*Attorney, Agent, or Firm*—Lowe, King, Price & Becker

[57] ABSTRACT

A method is disclosed for processing binary data prior to magnetic recording. The binary data is divided into 4-bit data segments which are converted to 8-bit codes according to a predetermined encoding transfer function describing the relationships between the 4-bit data segments and corresponding 8-bit codes, wherein the bit pattern of each 8-bit code has an intra-code run-length of at least two "0" bits and forms an inter-code run-length of from at least two "0" bits to at most nine "0"bits with an adjacent 8-bit code. The method further includes the step of generating a frame synchronization code and interleaving it with 8-bit codes to form a frame of binary digits. The frame sync code has a bit pattern which is unduplicatable by any combination of 8-bit codes that follow.

21 Claims, 5 Drawing Figures

METHOD AND APPARATUS FOR PROCESSING BINARY DATA

BACKGROUND OF THE INVENTION

The present invention relates to a method of and apparatus for processing digital signals, particularly for encoding the digital signals with a frame synchronization code prior to recording and decoding the coded signals upon reproduction.

Various attempts have hitherto been made to achieve high density recording of digitized analog audio signals. One such prior art approach, as shown and described in U.S. Pat. Nos. 3,624,637 and 3,641,525, involves organizing the binary data into a plurality of data segments and translating each data segment to a different bit pattern according to a predetermined rule. IEEE Transactions on Magnetics (Vol. MAG-13, No. 5, September 1977, Page 1202 by G. V. Jacoby) describes a similar technique which is known as Three-Phase Modulation (3PM) system. The coding technique of this type is generally treated in a publication "IBM Journal of Research and Development" (Vol. 14, July 1970, Page 376) by P. A. Franaszek in which Run Length Limited (RLL) coding method is proposed. The RLL coding method involves segmenting binary data into m-bit data segments and translating the m-bit data segments to n-bit codes (where $m<n$). This method restricts the number of "0" bits in each "0"-bit run length of the n-bit code to a range of from d to k. Because of these parameters the coded signal is described as (m, n, d, k) code.

The method of coding and decoding are currently evaluated in terms of maximum magnetic reversal time (Tmax) which is determined by the maximum run length of "0" bits, minimum magnetic reversal time (Tmin) which is determined by the minimum run length of "0" bits and window time (Tw) needed to detect magnetic reversals. Theoretically, high density recording could be achieved by simply reducing the Tmin value. However, since the recorded signals are reproduced in response to reversals of magnetic poles in the recording medium as a combined waveform of signal components arising from such reversals, the reduction of the Tmin value would result in an appreciable amount of interference between adjacent signal components. Because of this interference, the waveform of the reproduced signals tends to contain erratically occurring peaks and troughs with a resultant variation in amplitude. This leads to the introduction of detection errors.

On the other hand, a reduction of the Tmax value would result in a narrowing of the bandwidth of reproduced signal, causing the clock components to occupy a substantial part of the bandwidth. This allows a simple design for phase locked loop circuits used for regenerating the timing signal. Thus, in order for the phase locked loop to be properly functioning it is desirable that the value of Tmax be as small as possible.

It is desirable that the Tw value be as large as possible since the range for detecting peaks in the reproduced signal and hence the allowance of time-axis deviation of the peak is increased and the instances of detecting false peaks can be decreased.

Various conventional coding systems can be compared with each other in terms of the parameters just described as follows:

| Coding Systems | Tmin | Tmax | Tw |
|---|---|---|---|
| FM (Frequency Modulation) | 0.5T | T | 0.5T |
| MFM (Modified FM) | T | 2T | 0.5T |
| M$^2$FM (Modified MFM) | T | 2.5T | 0.5T |
| 4/5 GCR (Group Code Recording) | 0.8T | 2.4T | 0.8T |
| 3PM (Three-phase Modulation) | 1.5T | 6T | 0.5T | where, T represents the interbit spacing of the data prior to coding.

The Tmin value of 1.5T is considered to meet the requirement of high density recording. While the 3PM coding meets this requirement, difficulty is encountered when deriving the clock from the train of reproduced binary digits by the use of a phase locked loop.

On the other hand, it is the usual practice to organize a group of successively encoded data segments into a frame by interleaving a frame synchronization code which is used for discrimination during the inverse process of decoding. The current frame sync code has such a bit pattern to ensure against false detection in the presence of jitters.

Although the prior art frame sync code is immune to jitters, it is highly likely that similar bit patterns occur in the information data and false frame sync codes are detected. To avoid this shortcoming, prior art systems are provided with a sync protection circuit which gates on the frame sync by utilizing its periodicity. However, this arrangement is not yet satisfactory because if synchronism is lost it takes long to detect the proper timing and re-synchronize.

SUMMARY OF THE INVENTION

It is therefore an object of the present invention to provide a method of and apparatus for processing binary data by organizing the data into a frame format which maintains frame synchronism reliably without using the prior art sync protection circuit while at the same time allowing a relatively large value of minimum magnetic reversal time (Tmin) for high density recording and a relatively small value of maximum magnetic reversal time (Tmax) to ease the requirement for regenerating clock timing.

The invention provides a method for processing binary data prior to magnetic recording. The method comprises the steps of dividing the binary data into 4-bit data segments, converting the 4-bit data segments to 8-bit codes according to a predetermined encoding transfer function describing the relationships between the 4-bit data segments and corresponding 8-bit codes. The bit pattern of each 8-bit code has an intra-code run-length of at least two "0" bits and forms an inter-code run-length of from at least two "0" bits to at most nine "0" bits with an adjacent 8-bit code. The method further includes the step of generating a frame synchronization code, and serially combining the 8-bit codes and the frame synchronization code to form a frame of binary digits. The binary digits of the frame are recorded in a magnetic recording medium.

According to one feature of the invention, the encoded 8-bit codes allow the frame synchronization code to have a bit pattern which cannot be duplicated by any combination of the 8-bit codes that follow. This permits the system to readily recapture the frame sync code that occurs subsequent to the occurrence of a frame sync error to thereby minimize the out-of-sync period, if any, to at most one frame interval.

The method further comprises the steps of reproducing the 8-bit codes and frame synchronization code from the magnetic recording medium. The boundary bit pattern of the reproduced 8-bit codes which occurs between adjacent 8-bit codes is checked against one or more predetermined boundary conditions for detecting a match therebetween to generate a parameter of a predetermined decoding transfer function which is the inverse of the encoding transfer function. The 8-bit code to a 4-bit data segment is converted in response to the decoding transfer function and in response to the parameter. The converted 4-bit data segments are serially combined to recover the original binary data.

The Tmin value of the present invention is 1.5T which provides the same high density recording as the 3PM coding system, but 1.5 times greater high density recording than the MFM system, while the Tmax value is equal to or smaller than 5T which eases the circuit requirement for regenerating clock pulses from reproduced signals. The frame synchronization code of the invention has such a bit pattern that it is highly unlikely that any combination of 8-bit information codes duplicates the same bit pattern.

The apparatus for carrying out the method of the invention comprises a serial-to-parallel shift register means responsive to the original binary data for dividing it into successive 4-bit data segments in combination with encoding means having a predetermined encoding transfer function describing the relationships between the 4-bit data segment and corresponding 8-bit codes for translating the 4-bit data segment to an 8-bit code according to the transfer function. The bit pattern of the translated 8-bit code has an intra-code run-length of at least two "0" bits and forms an inter-code run-length of at most nine "0" bits with an adjacent 8-bit code. A second, parallel-to-serial shift register means is connected to receive the 8-bit code from the encoding means for sequential delivery of the 8-bit code. Timing means is provided to sequentially shift binary digits in the first and second shift register means. A frame synchronization code of (8×k) bits (where k is an integer) is generated and interleaved with the output of the second shift register means to form a frame of binary digits which are recorded in a magnetic recording medium.

BRIEF DESCRIPTION OF THE DRAWINGS

The present invention will be described in further detail with reference to the accompanying drawings, in which.

DETAILED DESCRIPTION

Figure 1:
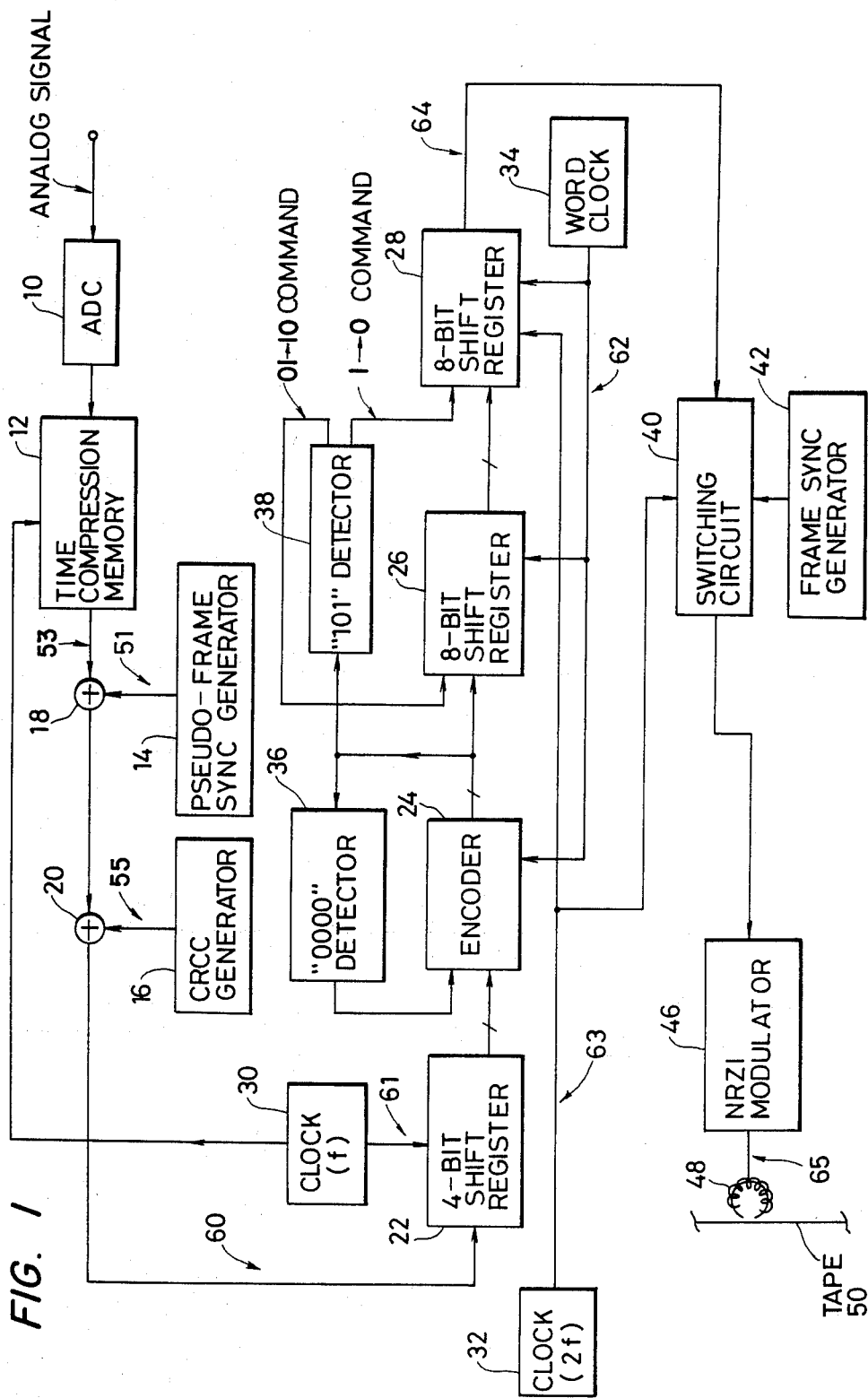
FIG. 1 is a block diagram of a video tape recording system embodying the present invention.

Referring now to FIG. 1, there is shown a preferred embodiment of a video tape recorder of the invention. An analog audio signal is sampled and quantized into digital data in a conventional analog-to-digital converter 10, having an output applied to a random access memory, or time compression memory 12. The time compression memory 12 is supplied with clock pulses at a frequency f from a first clock source 30 to read out the stored digital data to allow 16 bits of pseudo-frame sync code on bus 51 generated by a pseudo-frame sync generator 14 (the detail of which are described later) and 16 bits of cyclic redundancy check code on bus 55 generated by a known CRCC generator 16 to be interleaved with 256 bits of information data on bus 53 by adders 18 and 20 so that the data read out of the memory 12 are time-compressed into a frame format as illustrated in FIG. 2.

The framed data supplied by adder 20 to lead 60 is clocked into a 4-bit serial-to-parallel shift register 22 by clock pulses on lead 61 (see FIG. 3) from the first clock source 30 and is applied in parallel form to an encoder 24. (For convenience, the waveforms on the leads of FIG. 1 are indicated in FIGS. 2 and 3 with corresponding reference numerals; frequently the reference numerals for the waveforms are interchanged with those for the leads.) The encoder 24 converts the 4-bit data segment from the shift register 22 to an 8-bit code which is then supplied in parallel form to a parallel-to-parallel shift register 26 in response to a word clock pulse on lead 62, as supplied from a word clock source 34. The 8-bit code supplied to the shift register 26 is transferred in parallel form to a parallel-to-serial shift register 28 in response to the word clock pulse on lead 62 and delivered in serial form to a switching circuit 40 in response to clock pulses on lead 63 at frequency 2f supplied from a clock source 32.

Figure 2:
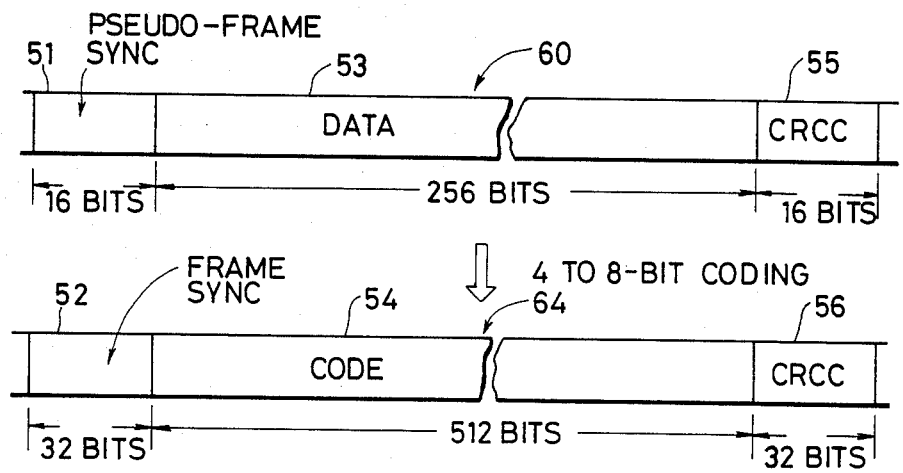
FIG. 2 is a sketch of the formats of a frame comprising 4-bit data segments and a frame of encoded 8-bit codes.
Figure 3:
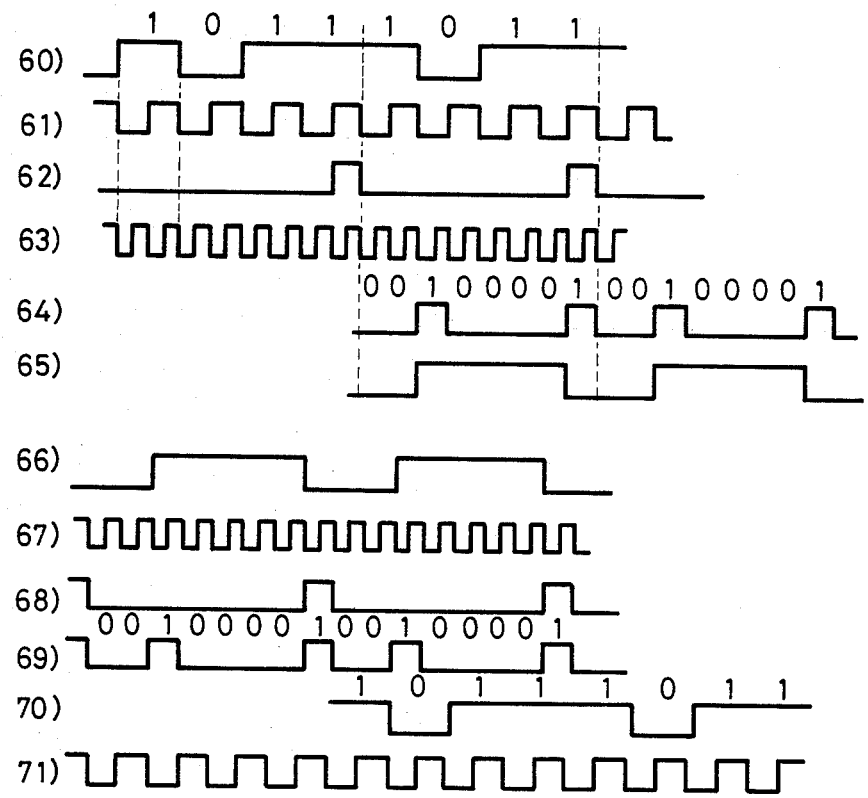
FIG. 3 is a timing diagram of various waveforms useful for describing the invention.

The data read out of shift register 28 onto lead 64 for each frame interval is thus converted into a stream of 32 bits forming frame sync code 52, 512 bits of information data 54 and 32 bits of cyclic redundant check code 56 by the 4-to-8 bit coding as illustrated in FIG. 2. The switching circuit 40 receives clock pulses from the second clock source 32 to detect the timing of frame synchronization to substitute an unduplicatable frame sync code 52 supplied from a frame sync generator 42 for the 32-bit frame sync code which has been converted from the 16-bit pseudo-frame sync 51. As described later, the frame sync code 52 has a bit pattern which is not duplicated by any combination of information codes which follow. A Non-Return-to-Zero Inverse modulator 46 is connected to receive pulses from the switching circuit 40 to modulate the pulses into a non-return-to-zero signal on lead 65; the signal on lead 65 is suitable for recording on a tape 50 through a transducer head 48.

The video tape recorder further includes a "0000-bit" detector 36 and a "101-bit" detector 38 which are connected to the output of the encoder 24. The "0000-bit" detector 36 has its output coupled to the encoder 24 and the "101-bit" detector 38 has a pair of outputs respectively coupled to the shift registers 26 and 28.

The operation of the circuit of FIG. 1 will be understood by a description of the 4-to-8-bit coding algorithm of the invention which is made with reference to Table I, illustrating the relationships between each 4-bit data segment and a corresponding 8-bit code. The coding principle is based on the requirement that the coded data stream contain an intra-code run-length of at least two "0" bits and an inter-code run-length of from at least two "0" bits to at most nine "0" bits. To meet this requirement the bit patterns of sequentially adjacent 8-bit codes are checked against the following boundary conditions:

Condition A: the four lower bits of a preceding 8-bit code are "0000";

Condition B: the least significant bit of a preceding code is "1"; and

Condition C: the two most significant bits of the next code are "01".

TABLE 1

(ENCODING ALGORITHM WITH Tmax = 5T)

| 4-Bit Data | 8-Bit Codes | |
|---|---|---|
| 0 0 0 0 | 0 0 0 0 1 0 0 0 | |
| 0 0 0 1 | 0 0 0 0 0 1 0 0 | or |
| | 1 0 0 1 0 0 0 1 | if condition A satisfied, or |
| | 1 0 0 1 0 0 0 0 | if conditions A, C satisfied |
| 0 0 1 0 | 0 0 0 0 0 0 1 0 | or |
| | 1 0 0 1 0 0 1 0 | if condition A satisfied |
| 0 0 1 1 | 0 0 0 0 1 0 0 1 | or |
| | 0 0 0 0 1 0 0 0 | if condition C satisfied |
| 0 1 0 0 | 0 0 0 1 0 0 0 0 | |
| 0 1 0 1 | 0 0 0 1 0 0 1 0 | |
| 0 1 1 0 | 0 0 0 1 0 0 0 1 | or |
| | 0 0 0 1 0 0 0 0 | if condition C satisfied |
| 0 1 1 1 | 0 1 0 0 1 0 0 1 | or |
| | 0 1 0 0 1 0 0 0 | if condition C satisfied, or |
| | 1 0 0 0 1 0 0 1 | if condition B satisfied, or |
| | 1 0 0 0 1 0 0 0 | if conditions B, C satisfied |
| 1 0 0 0 | 0 0 1 0 0 0 0 0 | |
| 1 0 0 1 | 0 0 1 0 0 1 0 0 | |
| 1 0 1 0 | 0 0 1 0 0 0 1 0 | |
| 1 0 1 1 | 0 0 1 0 0 0 0 1 | or |
| | 0 0 1 0 0 0 0 0 | if condition C satisfied |
| 1 1 0 0 | 0 1 0 0 1 0 0 0 | or |
| | 1 0 0 0 1 0 0 0 | if condition B satisfied |
| 1 1 0 1 | 0 1 0 0 0 1 0 0 | or |
| | 1 0 0 0 0 1 0 0 | if condition B satisfied |
| 1 1 1 0 | 0 1 0 0 0 0 1 0 | or |
| | 1 0 0 0 0 0 1 0 | if condition B satisfied |
| 1 1 1 1 | 0 1 0 0 0 0 0 1 | or |
| | 0 1 0 0 0 0 0 0 | if condition C satisfied, or |
| | 1 0 0 0 0 0 0 1 | if condition B satisfied, or |
| | 1 0 0 0 0 0 0 0 | if conditions B, C satisfied |

The encoder 24 essentially comprises a read only memory or a logic array from which the 8-bit codes are derived in response to the 4-bit input data as shown in Table I. The "0000" detector 36 and "101" detector 38 are provided for the purpose of changing the code form according to the conditions as stated above. For example, if a preceding code contains "0000" bits in the form least significant bit positions (condition A), the detector 36 supplies a command to the encoder 24 to alter the addressed 8-bit code to another code according to Table I if the input data is either "0001" or "0010". If data "0111" is followed by data "1100", encoder 24 derives a sequence of "101" formed by the least significant bit of the preceding code "01001001" (which corresponds to data "0111") and the two most significant bits of the succeeding code "01001000" (which corresponds to data "1100"). The "101" bit detector 38 detects these conditions (conditions B and C) and supplies a "change 1-to -0" command signal to th shift register 28 and a "change 01-to-10" command signal to the shift register 26. The shift register 28 changes the contents of the least significant bit of the preceding code now stored therein from "1" to "0" and the register 26 causes the two most significant bits of the succeeding code now stored therein to change from "01" to "10".

The detection of boundary conditions A, B and C and the manner of altering the codes can be simplified for hardware implementation by examining the contents of the input data rather than examining the contents of the encoded 8 bits.

In this embodiment, the conditions A, B and C are defined as follows:

Condition A: When preceding data is "0100" or "1000".

Condition B: When preceding data is any one of the following;
"0111"
"1100"
"1101"
"1110" and
"1111"

Condition C: When succeeding data is any one of the following:
"0011"
"0110"
"0111"
"1011" and
"1111".

Figure 4:
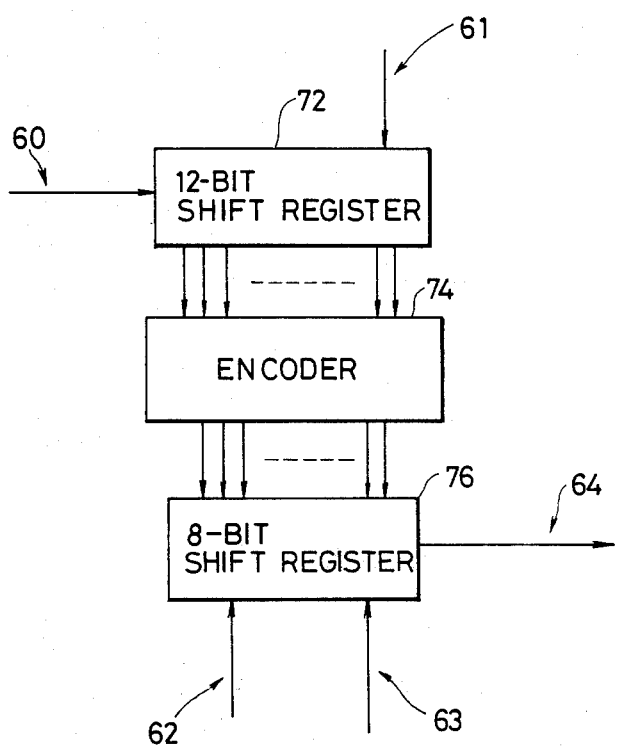
FIG. 4 is a block diagram of a modified embodiment of FIG. 1.

FIG. 4 is an illustration of a circuit which implements the coding algorithm just described. The circuit comprises a 12-bit serial-to-parallel shift register 72 which is clocked by pulses 61 to receive input data 60 to store a set of three successive data therein. The stored 12 bits are transferred in parallel form to an encoder 74 which essentially comprises a read only memory for storing the data which is addressed in response to the contents of the 12-bit address data according to the coding format of Table I and to the conditions A, B and C stated above. More specifically, the encoder 74 examines the contents of the data received from the shift register 72 to determine which conditions are satisfied to read out the corresponding code. The memory capacity of the read only memory needed for the above data conversion is 32 kilobits.

The retrieved 8-bit code is loaded in parallel form in response to the word clock on lead 62 to an 8-bit parallel-serial shift register 76 which is clocked out to the switching circuit 40 in response to clock pulses 63.

The operation of the pseudo-frame sync generator 14 is now described. The generator 14 is designed to generate a 16-bit pseudo-frame sync data. The bit pattern of this pseudo-frame sync derived from generator 14 may comprise, for example, "1001010101111010". After conversion by the encoder 24 or 74 according to the algorithm of Table I, the pseudo-frame sync data derived from generator 14 is converted to a 32-bit frame sync code having a bit pattern 00100100000100100100100100100010 which satisfies the minimum zero-bit intra-code run-length requirement as well as the maximum zero-bit inter-code run-length requirement. On the other hand, one example of the 32-bit pattern of the unduplicatable frame sync code 52 generated by the frame sync generator 42 is "00100100100100100100100100100010". Extensive analyses have been made of the latter sync code by the inventors to verify that the same bit pattern never occurs in any combination of 8-bit information codes. It is seen that the encoded 32-bit frame sync differs from the unduplicatable bit pattern only with respect to the 12th bit position from the most significant bit. That is, the encoded frame sync is identical with respect to the boundary conditions for the unduplicatable bit pattern. Therefore, the substitution of the latter frame sync for the encoded frame sync by the switching circuit 40 does not affect on the bit patterns of adjacent information codes during the inverse process of decoding which is described later.

Because of the unduplicatable nature of the frame sync bit pattern, the system would remain out of sync for at most one frame interval should an error occur in the frame sync code. Another advantage of the invention is that it eliminates the use of a frame sync protection circuit which is required in the prior art to ensure the timing of frame sync codes.

Since the coded signal has a minimum interpulse spacing of two "zeros" and a maximum interpulse spacing corresponding to nine "zeros" (which occurs only when data "1000", encoded to 00100000, is followed by "0000", encoded to 000001000), the minimum magnetic reversal time Tmin is 1.5T (where T is the interbit spacing of the 4-bit data) and the maximum magnetic reversal time Tmax is 5T. Since the Tmin value is equal to the Tmin value of the 3PM system, while the Tmax value is smaller than the Tmax value of the 3PM system, the present invention provides the same recording density as the 3PM system while relaxing the requirement for regenerating clock pulses during reproduction.

Figure 5:
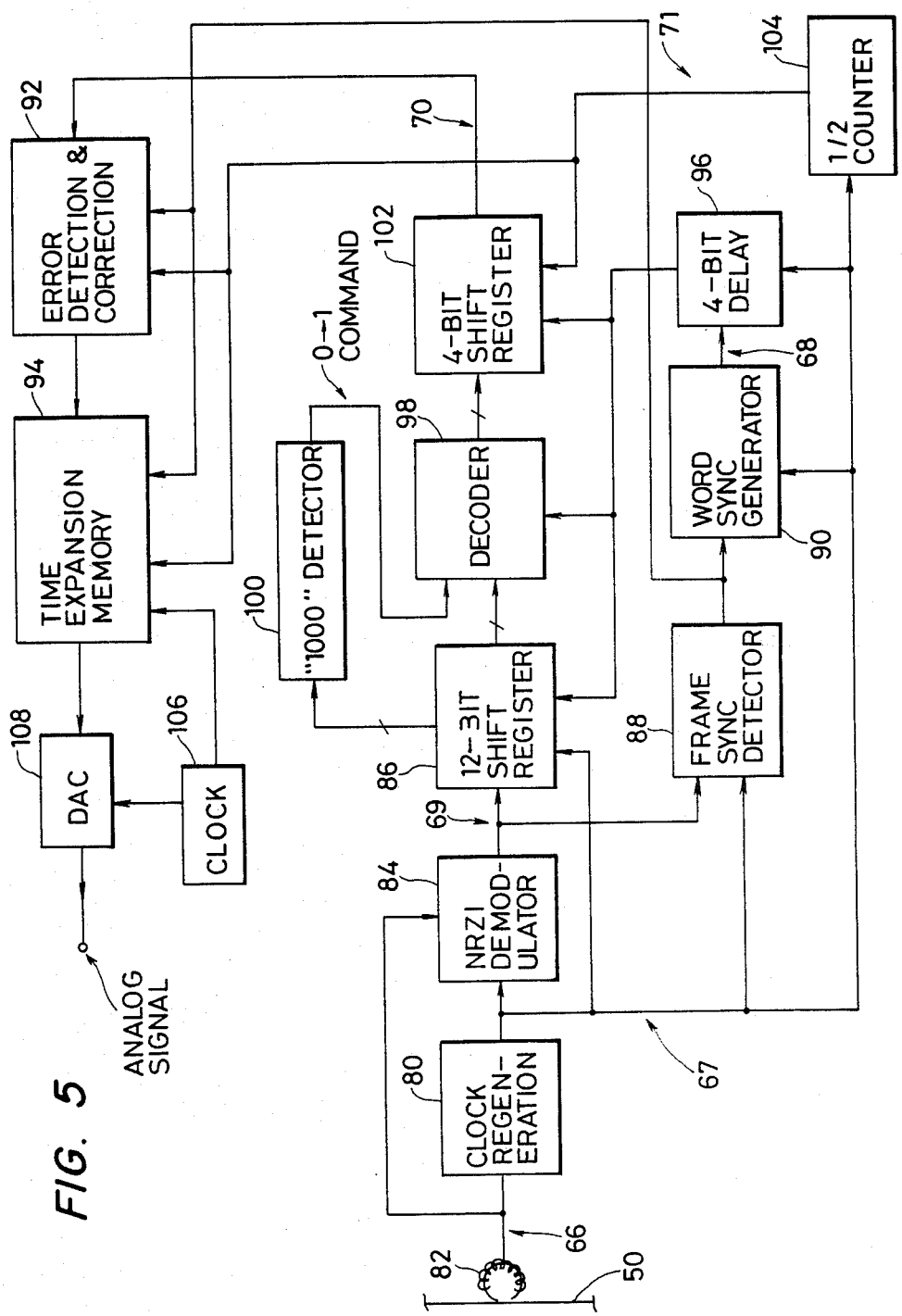
FIG. 5 is a block diagram of a video tape playback system used in conjunction with the system of FIG. 1.

FIG. 5 is a block diagram of a video tape playback system of the invention which may be combined with the video tape recorder of FIG. 1 in a single unit. The playback system comprises a clock regenerating circuit 80 which is coupled to a playback head 82 to regenerate clock pulses 67 at frequency 2f (FIG. 3). An NRZI demodulator 84 of a conventional design is coupled to the video head 82 and to the output of clock regenerator 80. The demodulator 84 generates an output signal on lead 69, having a waveform, FIG. 3, which is the replica of the waveform derived by shift register 28 on lead 64 of the recording system. The waveform on lead 69 is applied to a 12-bit serial-to-parallel shift register 86 and also to a frame sync detector 88. The shift register 86 is clocked by pulses on lead 67 from the clock regenerator 80 to accept the code signal on lead 69 from the demodulator 84. The frame sync detector 88 also receives the clock on lead 67 from the clock regenerator 80 to detect the 32-bit frame sync code. The detected frame sync is applied to a word sync generator 90 and to an error detection and correction circuit 92 and a time expansion memory 94. The word sync detector 90 is arranged to start counting pulses on lead 67 from clock regenerator 80 in response to the detection of a frame sync; detector 90 supplies word clock pulses to lead 68, as illustrated in FIG. 3. A 4-bit delay counter 96 is connected to the output of word sync detector. This delay counter 96 is arranged to start counting clock pulses on lead 67 in response to the detection of a word clock pulse 68 and generates a counter output at the count of every four clock pulses 67. The 4-bit delayed counter output is applied to the shift register 86 to allow the latter to store the whole bits of a given 8-bit code and the higher four bits of a succeeding 8-bit code and deliver the whole bits of the given code in parallel form to a decoder 98. A "1000-bit" detector 100 has an input coupled to respond to the 9th to 12th bit positions of the shift register 86 where the four most significant bits of the succeeding code are stored detector 100 has an output coupled to the decoder 98. When the four most significant bits of the succeeding code are "1000" (condition D), the detector 100 supplies a bit conversion command to the decoder 98. The decoder 98 essentially comprises a read only memory or the like storing a set of 31 original 4-bit data which are arranged to be read in response to the 8-bit code from the shift register 86 according to a conversion algorithm indicated in Table II below. Prior to the 8-to-4-bit conversion, the decoder 98 responds to the output of the detector 100 by examining the contents of the 8-bit address code to detect whether the latter corresponds to one of five codes indicated by asterisk (*) in Table II to convert the least significant bit of the 8-bit address code to "1".

TABLE II

| (DECODING ALGORITHM WITH Tmax = 5T) | | |
|---|---|---|
| 8-Bit Codes | 4-Bit Data | |
| 00000010 | 0010 | |
| 00000100 | 0001 | |
| 00001000* | 0000 | or |
| | 0011 | if condition D satisfied |
| 00001001 | 0011 | |
| 00010000* | 0100 | or |
| | 0110 | if condition D satisfied |
| 00010001 | 0110 | |
| 00010010 | 0101 | |
| 00100000* | 1000 | or |
| | 1011 | if condition D satisfied |
| 00100001 | 1011 | |
| 00100010 | 1010 | |
| 00100100 | 1001 | |
| 01000000 | 1111 | |
| 01000001 | 1111 | |
| 01000010 | 1110 | |
| 01000100 | 1101 | |
| 01001000* | 1100 | or |
| | 0111 | if condition D satisfied |
| 01001001 | 0111 | |
| 10000000 | 1111 | |
| 10000001 | 1111 | |
| 10000010 | 1110 | |
| 10000100 | 1101 | |
| 10001000* | 1100 | or |
| | 0111 | if condition D satisfied |
| 10001001 | 0111 | |
| 10010000 | 0001 | |
| 10010001 | 0001 | |
| 10010010 | 0010 | |

Since the least significant "1" bit of the particular codes indicated in Table I changes to "0" during the encoding operation if boundary condition B is satisfied, the conversion of the least significant bit to "1" by the decoder 98 is a process inverse to the encoding process. For example, the original data "0011" is first converted to a code "00001001" and the latter is further converted to "00001000" when condition B is satisfied; the conversion of a code "00001000" to "00001001" in the decoder 98 allows the latter code "00001001" to be reconverted to the original data "0011".

The output of the decoder 98 is supplied in parallel form to a 4-bit parallel-to-serial shift register 102 in response to a delayed word clock from the delay counter 96. The shift register 102 is clocked by pulses 71 (FIG. 3) at frequency f supplied from a divide-by-2 counter 104 which is coupled to the output of clock regenerator 80. Original 4-bit data on lead 70 with the waveform illustrated in FIG. 3 are thus delivered at frequency f in serial form from the shift register 102 to the error detection and correction circuit 92. The latter circuit detects the CRCC code for detecting erroneous data and correcting the bit by parity. The error free data are fed to the time expansion memory 94. The memory 94 is clocked by pulses from the counter 104 to receive the data from the error detection and correction circuit 92 and is clocked by a lower frequency clock from a source 106 to deliver the information data while discarding the frame sync code. The 4-bit information data are organized into the original data form in the memory 94 and delivered to a digital-analog converter 108 for digital to analog conversion.

Modified forms of encoding and decoding algorithms are illustrated in Tables III, IV, V and VI. Each of these algorithms provides the same Tmin value as in the previous embodiment. However the Tmax value is smaller than for the previous embodiment. This is advantageous to relax the requirement for regenerating clock pulses upon reproduction.

Table III indicates a coding algorithm with a Tmax of 4.5T. The following boundary conditions are additionally defined:

Condition E: When a preceding 4-bit data is one of the following:
"0010"
"0100"
"0111" and
"1110".

Condition F: When a preceding 4-bit data is "0100" or "0111".

Condition F′: When a preceding 4-bit data is other than "1000" and "0111".

Condition G: When a preceding 4-bit data is one of the following:
"0011"
"0100"
"0101"
"0111"
"1000"
"1011" and
"1111".

Condition H: When a succeeding 4-bit data is one of the following:
"1011"
"1100"
"1101"
"1110" and
"1111".

It will be seen that for hardware implementation a total of 12 bits is required to check the contents of the preceding, current and succeeding 4-bit data segments for detecting the boundary conditions E, F, F′, G, and H.

TABLE III
(ENCODING ALGORITHM WITH Tmax = 4.5T)

| 4-Bit Data | 8-Bit Codes | |
|---|---|---|
| 0 0 0 0 | 0 0 0 0 0 0 1 0 | or |
| | 1 0 0 1 0 0 1 0 | if condition E satisfied |
| 0 0 0 1 | 0 0 0 0 0 1 0 0 | or |
| | 0 1 0 0 1 0 0 0 | if condition F satisfied |
| 0 0 1 0 | 0 0 0 0 1 0 0 0 | or |
| | 0 1 0 0 1 0 0 0 | if condition F satisfied |
| 0 0 1 1 | 0 0 0 0 1 0 0 1 | or |
| | 0 0 0 0 0 1 0 0 | if condition H satisfied, or |
| | 1 0 0 1 0 0 0 1 | if condition E satisfied, or |
| | 1 0 0 1 0 0 0 0 | if conditions E & H satisfied |
| 0 1 0 0 | 0 0 0 1 0 0 0 0 | |
| 0 1 0 1 | 0 0 0 1 0 0 0 1 | or |
| | 0 1 0 0 0 0 0 0 | if conditions F,H satisfied, or |
| | 0 0 0 1 0 0 0 0 | if conditions F′,H satisfied |
| 0 1 1 0 | 0 0 0 1 0 0 1 0 | |
| 0 1 1 1 | 0 0 1 0 0 0 0 0 | |
| 1 0 0 0 | 0 0 1 0 0 0 0 1 | or |
| | 0 0 1 0 0 1 0 0 | if condition H satisfied |
| 1 0 0 1 | 0 0 1 0 0 0 1 0 | |
| 1 0 1 0 | 0 0 1 0 0 1 0 0 | |
| 1 0 1 1 | 0 1 0 0 0 0 0 1 | or |
| | 0 1 0 0 0 0 0 0 | if condition H satisfied, or |
| | 1 0 0 0 0 0 0 1 | if condition G satisfied, or |
| | 1 0 0 0 0 0 0 0 | if conditions G, H satisfied |
| 1 1 0 0 | 0 1 0 0 0 0 1 0 | or |
| | 1 0 0 0 0 0 1 0 | if condition G satisfied |
| 1 1 0 1 | 0 1 0 0 0 1 0 0 | or |
| | 1 0 0 0 0 1 0 0 | if condition G satisfied |

TABLE III-continued
(ENCODING ALGORITHM WITH Tmax = 4.5T)

| 4-Bit Data | 8-Bit Codes | |
|---|---|---|
| 1 1 1 0 | 0 1 0 0 1 0 0 0 | or |
| | 1 0 0 0 1 0 0 0 | if condition G satisfied |
| 1 1 1 1 | 0 1 0 0 1 0 0 1 | or |
| | 0 1 0 0 1 0 0 0 | if condition H satisfied, or |
| | 1 0 0 0 1 0 0 1 | if condition G satisfied, or |
| | 1 0 0 0 1 0 0 0 | if condition G, H satisfied |

Table IV shown below is a decoding algorithm to be used in conjunction with the coding algorithm of Table III. A total of 16 bits is required for checking the four least significant bits of a preceding 8-bit code, the whole bits of the current 8-bit code and the four most significant bits of the next 8-bit code to detect the conditions listed in Table IV.

TABLE IV
(DECODING ALGORITHM WITH Tmax = 4.5T)

| 8-Bit Codes | 4-Bit Data | |
|---|---|---|
| 0 0 0 0 0 0 1 0 | 0 0 0 0 | |
| 0 0 0 0 0 1 0 0 | 0 0 0 1 | or |
| | 0 0 1 1 | if condition D satisfied |
| 0 0 0 0 1 0 0 0 | 0 0 1 0 | or |
| | 0 1 0 1 | if condition D satisfied |
| 0 0 0 0 1 0 0 1 | 0 0 1 1 | |
| 0 0 0 1 0 0 0 0 | 0 1 0 0 | |
| 0 0 0 1 0 0 1 0 | 0 1 0 1 | |
| 0 0 0 1 0 0 1 0 | 0 1 1 0 | |
| 0 0 1 0 0 0 0 0 | 0 1 1 1 | |
| 0 0 1 0 0 0 0 1 | 1 0 0 0 | |
| 0 0 1 0 0 0 1 0 | 1 0 0 1 | |
| 0 0 1 0 0 1 0 0 | 1 0 1 0 | or |
| | 1 0 0 0 | if condition D satisfied |
| 0 1 0 0 0 0 0 0 | 1 0 1 1 | or |
| | 0 1 0 1 | if condition I satisfied |
| 0 1 0 0 0 0 0 1 | 1 0 1 1 | |
| 0 1 0 0 0 0 1 0 | 1 1 0 0 | |
| 0 1 0 0 0 1 0 0 | 1 1 0 1 | or |
| | 0 0 0 1 | if condition I satisfied |
| 0 1 0 0 1 0 0 0 | 1 1 1 0 | or |
| | 0 0 1 0 | if condition I satisfied, or |
| | 1 1 1 1 | if conditions I and D satisfied |
| 0 1 0 0 1 0 0 1 | 1 1 1 1 | |
| 1 0 0 0 0 0 0 0 | 1 0 1 1 | |
| 1 0 0 0 0 0 0 1 | 1 0 1 1 | |
| 1 0 0 0 0 0 1 0 | 1 1 0 0 | |
| 1 0 0 0 0 1 0 0 | 1 1 0 1 | |
| 1 0 0 0 1 0 0 0 | 1 1 1 0 | or |
| | 1 1 1 1 | if condition D satisfied |
| 1 0 0 0 1 0 0 1 | 1 1 1 1 | |
| 1 0 0 1 0 0 0 0 | 0 0 1 1 | |
| 1 0 0 1 0 0 0 1 | 0 0 1 1 | |
| 1 0 0 1 0 0 1 0 | 0 0 0 0 | |

Note: The boundary condition I is met when the 4 least significant bits of a preceding 8-bit code are "0000".

Typical examples of frame sync codes suitable for the algorithms of Tables III and IV are given as follows:
(1) "00100100100100100100100100100XXX", and
(2) "XXX00100100100100100100100100100", where "XXX" represents one of "000", "010", "001" and "100".

Tables V and VI shown below respectively indicate coding and decoding algorithms for the Tmax value of 4T.

In the coding algorithm of Table V, additional boundary conditions as defined below are included.

Condition J: When a preceding 4-bit data segment is one of the following:
"0001"
"0010"
"0100"

"0111"
"1010"
"1101" and
"1110"

Condition K: When a preceding 4-bit data occur in a sequence of "0010" and "0001" or in a sequence of "1110" and "0001".

Condition L: When a preceding 4-bit data is "0010" or "1110".

TABLE V (ENCODING ALGORITHM WITH Tmax = 4T)

| 4-Bit Data | 8-Bit Codes | |
|---|---|---|
| 0 0 0 0 | 0 0 0 0 0 0 1 0 | or |
| | 1 0 0 1 0 0 1 0 | if condition J satisfied |
| 0 0 0 1 | 0 0 0 0 0 1 0 0 | or |
| | 0 1 0 0 0 1 0 0 | if conditions F & K satisfied, or |
| | 1 0 0 1 0 0 0 0 | if condition L satisfied |
| 0 0 1 0 | 0 0 0 0 1 0 0 0 | or |
| | 0 0 0 0 1 0 0 1 | if condition F & K satisfied |
| 0 0 1 1 | 0 0 0 0 1 0 0 1 | or |
| | 0 0 0 0 0 1 0 0 | if condition H satisfied, or |
| | 1 0 0 1 0 0 0 1 | if condition J satisfied, or |
| | 0 1 0 0 0 1 0 0 | if condition J & H satisfied |
| 0 1 0 0 | 0 0 0 1 0 0 0 0 | or |
| | 1 0 0 1 0 0 0 0 | if conditions F & K satisfied |
| 0 1 0 1 | 0 0 0 1 0 0 0 1 | or |
| | 0 0 0 0 1 0 0 0 | if condition H satisfied, or |
| | 0 1 0 0 0 0 0 1 | if conditions F & K satisfied, or |
| | 0 1 0 0 0 0 0 0 | if conditions F, K, H satisfied |
| 0 1 1 0 | 0 0 0 1 0 0 1 0 | or |
| | 0 1 0 0 0 0 1 0 | if conditions F & K satisfied |
| 0 1 1 1 | 0 0 1 0 0 0 1 0 | |
| 1 0 0 0 | 0 0 1 0 0 0 0 1 | or |
| | 0 0 1 0 0 1 0 0 | if condition H satisfied |
| 1 0 0 1 | 0 0 1 0 0 0 1 0 | |
| 1 0 1 0 | 0 0 1 0 0 1 0 0 | |
| 1 0 1 1 | 0 1 0 0 0 0 0 1 | or |
| | 0 1 0 0 0 0 0 0 | if condition H satisfied, or |
| | 1 0 0 0 0 0 0 1 | if conditions G, K satisfied, or |
| | 1 0 0 0 0 1 0 0 | if conditions G, K, H satisfied |
| 1 1 0 0 | 0 1 0 0 0 0 1 0 | or |
| | 1 0 0 0 0 0 1 0 | if conditions G, K satisfied |
| 1 1 0 1 | 0 1 0 0 0 0 1 0 | or |
| | 1 0 0 0 0 0 1 0 | if conditions G, K satisfied |
| 1 1 1 0 | 0 1 0 0 1 0 0 0 | or |
| | 1 0 0 0 1 0 0 0 | if conditions G, K satisfied |
| 1 1 1 1 | 0 1 0 0 1 0 0 1 | or |
| | 0 1 0 0 1 0 0 0 | if condition H satisfied, or |
| | 1 0 0 0 1 0 0 1 | if conditions G, K satisfied, or |
| | 1 0 0 0 1 0 0 0 | if conditions G, K, H satisfied |

With the coding algorithm of Table V, a total of 16 bits is required to check the contents of a sequence of two 4-bit data segments, the current 4-bit data segment and the next 4-bit data segment for detecting the conditions listed above.

TABLE VI (DECODING ALGORITHM WITH Tmax = 4T)

| 8-Bit Codes | 4-Bit Data | |
|---|---|---|
| 0 0 0 0 0 0 1 0 | 0 0 0 0 | |
| 0 0 0 0 0 1 0 0 | 0 0 0 1 | or |
| | 0 0 1 1 | if condition D satisfied |
| 0 0 0 0 1 0 0 0 | 0 0 1 0 | or |
| | 0 1 0 1 | if condition D satisfied |
| 0 0 0 0 1 0 0 1 | 0 0 1 1 | |
| 0 0 0 1 0 0 0 0 | 0 1 0 0 | |
| 0 0 0 1 0 0 0 1 | 0 1 0 1 | |
| 0 0 0 1 0 0 1 0 | 0 1 1 0 | |
| 0 0 1 0 0 0 0 0 | 0 1 1 1 | |
| 0 0 1 0 0 0 0 1 | 1 0 0 0 | |
| 0 0 1 0 0 0 1 0 | 1 0 0 1 | |
| 0 0 1 0 0 1 0 0 | 1 0 1 0 | or |
| | 1 0 0 0 | if condition D satisfied |
| 0 1 0 0 0 0 0 0 | 0 1 0 1 | or |
| | 1 0 1 1 | if condition I satisfied |
| 0 1 0 0 0 0 0 1 | 1 0 1 1 | or |

TABLE VI-continued (DECODING ALGORITHM WITH Tmax = 4T)

| 8-Bit Codes | 4-Bit Data | |
|---|---|---|
| | 0 1 0 1 | if condition I satisfied |
| 0 1 0 0 0 0 1 0 | 1 1 0 0 | or |
| | 0 1 1 0 | if condition I satisfied |
| 0 1 0 0 0 1 0 0 | 1 1 0 1 | or |
| | 0 0 0 1 | if condition I satisfied, or |
| | 0 0 1 1 | if condition D satisfied |
| 0 1 0 0 1 0 0 0 | 1 1 1 0 | or |
| | 0 0 1 0 | if condition I satisfied, or |
| | 1 1 1 1 | if condition D satisfied |
| 0 1 0 0 1 0 0 1 | 1 1 1 1 | |
| 1 0 0 0 0 0 0 1 | 1 0 1 1 | |
| 1 0 0 0 0 0 1 0 | 1 1 0 0 | |
| 1 0 0 0 0 1 0 0 | 1 1 0 1 | or |
| | 1 0 1 1 | if condition D satisfied |
| 1 0 0 0 1 0 0 0 | 1 1 1 0 | or |
| | 1 1 1 1 | if condition D satisfied |
| 1 0 0 0 1 0 0 1 | 1 1 1 1 | |
| 1 0 0 1 0 0 0 0 | 0 0 0 1 | * |
| | 0 1 0 0 | if condition I satisfied |
| 1 0 0 1 0 0 0 1 | 0 0 1 1 | |
| 1 0 0 1 0 0 1 0 | 0 0 0 0 | |

*: If the four least significant bits of a preceding 8-bit code are "1000".

A total of 16 bits is required to check the contents of the lower least significant four bits of a preceding 8-bit code, the whole bits of the current 8-bit code and the four most significant bits of the next 8-bit code for detecting the conditions listed in Table VI.

A typical example of the unduplicatable frame sync codes for the encoding algorithm of Table VI is given as follows:

"0X00100000001001001000000100100", where X is "1" or "0".

What is claimed is:

1. A method of processing binary data, comprising the steps of:

dividing all of the binary data into 4-bit data segments;

converting all of the 4-bit data segments to 8-bit codes according to a predetermined encoding transfer function describing the relationships between said 4-bit data segments and corresponding 8-bit codes, wherein the bit pattern of each said 8-bit code has an intra-code run-length of at least two "0" bits and forms an inter-code run-length susceptible of extending from at least two "0" bits to at most nine "0" bits with an adjacent 8-bit code;

generating a frame synchronization code; and serially combining said 8-bit codes and said frame synchronization code to form a frame of binary digits, and recording the binary digits of the frame in a magnetic recording medium, the recorded frame format inherently reliably maintaining frame synchronization while providing a relatively large value of minimum magnetic reversal time and a relatively small value of maximum magnetic reversal time.

2. A method for processing binary data prior to recording, comprising the steps of:

dividing the binary data into 4-bit data segments;

converting the 4-bit data segments to 8-bit codes according to a predetermined encoding transfer function describing the relationship between said 4-bit data segments and corresponding 8-bit codes, wherein the bit pattern of each said 8-bit code has an intra-code run-length of at least two "0" bits and forms an inter-code run-length of from at least two "0" bits to at most nine "0" bits with an adjacent 8-bit code;
generating a frame synchronization code;
serially combining said 8-bit codes and said frame synchronization code to form a frame of binary digits,
the converting step comprising checking the boundary bit pattern of the serially combined 8-bit codes which occurs between adjacent 8-bit codes against one or more predetermined boundary conditions for detecting a match therebetween; and
generating a said 8-bit code in response to said transfer function and said match.

3. A method for processing binary data prior to recording, comprising the steps of:
dividing the binary data into 4-bit data segments;
converting the 4-bit data segments to 8-bit codes according to a predetermined encoding transfer function describing the relationship between said 4-bit data segments and corresponding 8-bit codes, wherein the bit pattern of each said 8-bit code has an intra-code run-length of at least two "0" bits and forms an inter-code run-length of from at least two "0" bits to at most nine "0" bits with an adjacent 8-bit code;
generating a frame synchronization code;
serially combining said 8-bit codes and said frame synchronization code to form a frame of binary digits,
the converting step comprising checking the bit patterns of adjacent ones of said 4-bit data segments against one or more predetermined bit patterns for detecting a match therebetween; and
generating a said 8-bit code in response to said transfer function and said match.

4. A method as claimed in claim 1, wherein the maximum number of "0" bits in said inter-code run-length is eight.

5. A method as claimed in claim 1, wherein the maximum number of "0" bits in said inter-code run-length is seven.

6. A method as claimed in claim 1, wherein said frame synchronization code has a bit pattern which is unduplicatable by any combination of the bit patterns of said 8-bit codes.

7. A method for processing binary data prior to recording, comprising the steps of:
dividing the binary data into 4-bit data segments;
converting the 4-bit data segments to 8-bit codes according to a predetermined encoding transfer function describing the relationship between said 4-bit data segments and corresponding 8-bit codes, wherein the bit pattern of each said 8-bit code has an intra-code run-length of at least two "0" bits and forms an inter-code run-length of from at least two "0" bits to at most nine "0" bits with an adjacent 8-bit code;
generating a frame synchronization code;
serially combining said 8-bit codes and said frame synchronization code to form a frame of binary digits,
wherein said frame synchronization code comprises one of the following bit patterns:
"00100100100100100100100100XXX"
"XXX00100100100100100100100100" and
"0Y00100000001001001000000100100", where "XXX" represents one of "000", "100", "010" and "001", and "Y" represents one of "1" and "0", and wherein said frame synchronization code is generated by the steps of:
generating a pseudo-frame synchronization bit pattern;
interleaving said pseudo-frame synchronization bit pattern with said binary data to thereby allow said pseudo-frame synchronization bit pattern to be divided into 4-bit segments and converted to a bit pattern the boundary conditions of which are identical to the boundary conditions of said frame synchronization code, and
replacing the last-mentioned bit pattern with said frame synchronization code.

8. A method for processing binary data prior to recording, comprising the steps of:
dividing the binary data into 4-bit data segments;
converting the 4-bit data segments to 8-bit codes according to a predetermined encoding transfer function describing the relationship between said 4-bit data segments and corresponding 8-bit codes, wherein the bit pattern of each said 8-bit code has an intra-code run-length of at least two "0" bits and forms an inter-code run-length of from at least two "0" bits to at most nine "0" bits with an adjacent 8-bit code;
generating a frame synchronization code;
serially combining said 8-bit codes and said frame synchronization code to form a frame of binary digits,
wherein said frame synchronization code is generated by the steps of:
generating a pseudo-frame synchronization bit pattern;
interleaving said pseudo-frame synchronization bit pattern with said binary data to thereby allow said pseudo-frame synchronization bit pattern to be divided into 4-bit segments and converted to a bit pattern the boundary conditions of which are identical to the boundary conditions of said frame synchronization code, and
replacing the last-mentioned bit pattern with said frame synchronization code.

9. A method for processing binary data prior to recording, comprising the steps of:
dividing the binary data into 4-bit data segments;
converting the 4-bit data segments to 8-bit codes according to a predetermined encoding transfer function describing the relationship between said 4-bit data segments and corresponding 8-bit codes, wherein the bit pattern of each said 8-bit code has an intra-code run-length of at least two "0" bits and forms an inter-code run-length of from at least two "0" bits to at most nine "0" bits with an adjacent 8-bit code;
generating a frame synchronization code;
serially combining said 8-bit codes and said frame synchronization code to form a frame of binary digits,
reproducing the 8-bit codes and frame synchronization code of said frame from said recording medium;
checking the boundary bit pattern of the recorded 8-bit codes which occurs between adjacent 8-bit codes against one or more predetermined boundary conditions for detecting a match therebetween to generate a parameter of a predetermined decoding transfer function which is inverse to said encoding transfer function;

converting the 8-bit code to a 4-bit data segment in accordance with said decoding transfer function and said parameter; and serially combining said converted 4-bit data segments to recover the original binary data.

10. Apparatus for processing binary data comprising:
first serial-to-parallel shift register means receptive of said binary data for dividing the binary data into 4-bit data segments;
encoding means having a predetermined encoding transfer function describing the relationships between said 4-bit data segment and corresponding 8-bit codes for translating said 4-bit data segment to a said 8-bit code according to the transfer function, wherein the bit pattern of said translated 8-bit code has an intra-code run-length of at least two "0" bits and forms an inter-code run-length of at most nine "0" bits with an adjacent 8-bit code;
second parallel-to-serial shift register means connected to receive said 8-bit code from said encoding means;
timing means for sequentially shifting binary digits in said first and second shift register means;
means for generating a frame synchronization code;
means for interleaving said frame synchronization code with the output of said second shift register means to form a frame of binary digits; and
means for recording the binary digits of said frame in a magnetic recording medium.

11. Apparatus as claimed in claim 10, wherein said first shift register means comprises a (4×N)-bit serial-to-parallel shift register receptive of said binary data for dividing the same into (4×N)-bit data segments, and said second shift register means comprises an 8-bit parallel-to-serial shift register receptive of the output of said encoding means, and wherein said encoding means is receptive of the output of said (4×N)-bit shift register for checking the bit pattern of said (4×N)-bit data segments against a predetermined bit pattern to provide a parameter of said encoding transfer function to said encoding means, where N is an integer equal to or greater than three.

12. Apparatus as claimed in claim 10, wherein said first shift register means comprises a 4-bit serial-to-parallel shift register for dividing said binary data into 4-bit data segments, and wherein said second shift register means comprises a first 8-bit parallel-to-parallel shift register receptive of the output of said encoding means and a second 8-bit parallel-to-serial shift register receptive of the output of said first 8-bit shift register, and means coupled to the output of said encoding means for checking the bit patterns of the 8-bit codes which are successively delivered from said encoding means against one or more predetermined bit patterns to detect a match therebetween to provide a parameter of said encoding transfer function to said encoding means and to cause said first and second 8-bit shift registers to replace one or more binary digits of the 8-bit codes stored therein with one or more predetermined binary digits.

13. Apparatus as claimed in claim 10, wherein said encoding means comprises a memory storing a plurality of 8-bit codes addressable in response to said 4-bit data segment according to said encoding transfer function.

14. Apparatus as claimed in claim 10, wherein the maximum number of "0" bits in said inter-code run-length is 8.

15. Apparatus as claimed in claim 10, wherein the maximum number of "0" bits in said inter-code run-length is 7.

16. Apparatus as claimed in claim 10, wherein said frame synchronization code has a bit pattern which is unduplicatable by any combination of the bit patterns of said 8-bit codes.

17. Apparatus as claimed in claim 16, wherein said means for generating frame synchronization code comprises:
means for generating a pseudo-frame synchronization bit pattern;
means for interleaving said pseudo-frame synchronization bit pattern with said binary data for application to said first shift register means, whereby said pseudo-frame synchronization bit pattern is converted to a bit pattern the boundary bits of which are identical to the boundary bits of said frame synchronization code, and
means for replacing the last-mentioned bit pattern with said frame synchronization code.

18. Apparatus as claimed in claim 16, wherein said frame synchronization code comprises one of the following bit patterns:
"0010010010010010010010010010XXX",
"XXX0010010010010010010010010100" and
"0Y0010000000100100100000000100100", where "XXX" represents one of "000", "100", "010" and "001", and "Y" represents one of "1" and "0".

19. Apparatus as claimed in claim 10, 11, 12, 13, 14, 15 or 16, further comprising:
means for reproducing the binary digits of the frame from said recording medium;
third, serial-to-parallel shift register means receptive of said reproduced binary digits;
decoding means having a predetermined decoding transfer function which is inverse to the encoding transfer function for converting said 8-bit code to a 4-bit data segment according to the decoding transfer function;
fourth, parallel-to-serial shift register means receptive of the 4-bit data segment from said decoding means;
means for deriving a timing signal from said reproduced binary digits for successively shifting binary digits in said third and fourth shift register means; and
means for removing the frame synchronization code from the output of said fourth shift register means.

20. Apparatus as claimed in claim 19, wherein said decoding means comprises means for checking the bit pattern of binary digits stored in said third shift register means against a predetermined bit pattern to detect a match therebetween for providing a parameter of said decoding transfer function to said decoding means.

21. Apparatus as claimed in claim 19, wherein said decoding means comprises a memory storing a plurality of 4-bit data segments addressable in response to said 8-bit code according to said decoding transfer function.

* * * * *